United States Patent
Draper et al.

(10) Patent No.: US 7,157,172 B2
(45) Date of Patent: Jan. 2, 2007

(54) COMBINATION NICKEL FOAM EXPANDED NICKEL SCREEN ELECTRICAL CONNECTION SUPPORTS FOR SOLID OXIDE FUEL CELLS

(75) Inventors: Robert Draper, Pittsburgh, PA (US); Thomas Prevish, Trafford, PA (US); Angela Bronson, Pittsburgh, PA (US); Raymond A. George, Pittsburgh (JP)

(73) Assignee: Siemens Power Generation, Inc., Orlando, FL (US)

( * ) Notice: Subject to any disclaimer, the term of this patent is extended or adjusted under 35 U.S.C. 154(b) by 578 days.

(21) Appl. No.: 10/444,623

(22) Filed: May 23, 2003

(65) Prior Publication Data

US 2004/0234830 A1 Nov. 25, 2004

(51) Int. Cl.
*H01M 8/12* (2006.01)
*H01M 8/24* (2006.01)

(52) U.S. Cl. .......................................... 429/31; 429/32

(58) Field of Classification Search ................ None
See application file for complete search history.

(56) References Cited

U.S. PATENT DOCUMENTS

| | | | |
|---|---|---|---|
| 4,490,444 A | 12/1984 | Isenberg | |
| 4,648,945 A | 3/1987 | Isenberg | |
| 4,833,045 A | 5/1989 | Pollack et al. | |
| 5,258,240 A | 11/1993 | Di Croce et al. | |
| 5,273,838 A | 12/1993 | Draper et al. | |
| 5,456,833 A | 10/1995 | Butcher et al. | |
| 6,379,831 B1 | 4/2002 | Draper et al. | |
| 6,416,897 B1 | 7/2002 | Tomlins et al. | |

FOREIGN PATENT DOCUMENTS

| JP | 60 093768 | 5/1985 |
|---|---|---|
| JP | 08 236129 | 9/1996 |

OTHER PUBLICATIONS

Haack, David, Kenneth Butcher, T. Kim, and T.J. Lu, Novel Lightweight Metal Foam Head Exchangers, pp. 1-7, University of Cambridge, Cambridge, UK, Nov. 2001.*
Yamazaki et al., "Side-Lead Interconnection for Alloy-Separator Planar Stacks", Proceedings of Fifth International Symposium on Solid Oxide Fuel Cells (SOFC-V), The Institution of Electrical Engineers, Jun. 2-5, 1997, Abstract—2 pages, Germany.

* cited by examiner

Primary Examiner—Jonathan Crepeau

(57) ABSTRACT

A solid oxide fuel assembly is made, wherein rows (14, 25) of fuel cells (17, 19, 21, 27, 29, 31), each having an outer interconnection (20) and an outer electrode (32), are disposed next to each other with corrugated, electrically conducting expanded metal mesh member (22) between each row of cells, the corrugated mesh (22) having top crown portions and bottom portions, where the top crown portion (40) have a top bonded open cell nickel foam (51) which contacts outer interconnections (20) of the fuel cells, said mesh and nickel foam electrically connecting each row of fuel cells, and where there are no more metal felt connections between any fuel cells.

23 Claims, 6 Drawing Sheets

COMBINATION NICKEL FOAM EXPANDED NICKEL SCREEN ELECTRICAL CONNECTION SUPPORTS FOR SOLID OXIDE FUEL CELLS

GOVERNMENT CONTRACT

The Government of the United States of America has rights in this invention pursuant to Contract No. DE-FC-2697FT34139, awarded by the United States Department of Energy.

BACKGROUND OF THE INVENTION

1. Field of the Invention

This invention relates generally to inexpensive high strength, flexible, thin, improved electrical connectors and supports for tubular solid oxide electrolyte fuel cells in a fuel cell generator.

2. Description of the Prior Art

Square pitched, series-parallel, nickel felt to nickel coated interconnection components of solid oxide fuel cells are well known, and taught in U.S. Pat. Nos. 4,490,444 and 4,833,045 (Isenberg and Pollack-Reichner, respectively). Their connection to the main fuel cell generator current collect bus bars was also taught by Isenberg, in U.S. Pat. No. 4,648,945. The fuel cells used usually contain a self-supported air electrode tube, where the air electrode is covered over about 300 degrees by a solid electrolyte film. Thus, there is a 60 degree wide axial strip down the length of the cell. This remaining 60 degrees of air electrode surface is covered by an interconnection strip, usually a nickel plated lanthanum-chromite. As a top layer, fuel electrode covers the solid electrolyte over about 280 degrees of the electrolyte surface.

These cylindrical cells are usually placed in a square pitch, series-parallel connected array, wherein the air electrode of one cell is connected to the fuel electrode of the adjacent series-connected cell by a plated interconnection strip and a strip of 80% to 95% porous sintered nickel felt, which is about 0.1 inch (0.25 cm) thick. Other nickel felts provide parallel connections between the fuel electrodes of adjacent cells. The series path is essential for the generation of a practical-DC stack voltage. The parallel connections provide paths by which the current can circumnegotiate any defective open circuit cells. Fuel flows axially in the passages between the groups of cells. This has been one tubular fuel cell design for many years.

In this design, the primary subassemblies from which a solid oxide fuel cell generator is formed are called "cell bundles". Usually, cell bundles contain twenty-four cells on an 8×3 cell matrix. Eight cells are series connected to form one row of a three-row bundle. The three rows are connected in parallel through the connection of each cell in the row with the adjacent cell in the next row. Between the nickel plated interconnection strip of one cell and the nickel fuel electrode of the next cell in a row, any two cells are presently series connected by a nickel felt of a rectangular cross-section (approximately 10 mm×14 mm). Parallel connection is also currently accomplished by similar felt strips. In this case, the felts connect the fuel electrodes of adjacent cells. Along the length of a cell, eight felts of about 185-mm length are used to form a series connection, and four felts of 185-mm length are used to accomplish a parallel connection. A total of 280 felt strips are used per bundle. This means of electrical connection is effective; however, it is costly in terms of materials and is labor intensive. Furthermore, this arrangement is not very conducive to automation.

Improvements to this standard design have been suggested. U.S. Pat. No. 5,273,838 (Draper/Zymboly) eliminated one nickel felt connector from each group of four cells, where alternate cells of a first row had no electrical connection of their interconnections to cells in an adjacent row. This design helped to eliminate the potential for bowing when using newer, longer one meter cells. This design may, however, decrease the overall strength of the twenty-four cell subassemblies.

In an attempt to simplify generator design and reduce assembling costs, DiCroce and Draper, in U.S. Pat. No. 5,258,240, taught a thick, flat-backed, porous metal fiber felt connector strip, having a crown portion of metallic fiber felt conforming to the surface of its contacting fuel cell These porous felt connectors could be used as a series of thin strips across a small part of the fuel cell length, or as a porous sheet extending along the entire axial length of the fuel cells. In order to provide structural integrity, since there are no side connections, a plurality of cells would have to be laminated to provide a thickness of 0.125 inch (0.62 cm), thereby reducing porosity to about 5 to 10%. The strips could also be made of a solid nickel foil or a composite of foil and porous felt; they could also have two opposing fuel cell conforming surface, as shown in FIG. 3 of that patent. The use of fibrous felts still allowed potential densification during prolonged use. Additionally, it was difficult to fashion such felts to exact dimensions, and the felts retailed a springiness. Conversely, the use of foils did not provide adequate strength, and prevented the required infiltration of he bundle with hot air during the drying process, which is an important feature of bundle manufacture.

Draper et al. in U.S. Pat. No. 6,379,831 B1 attempted to solve all these problems by providing a corrugated mesh electrical connector having a top crown and bottom shoulder portion where the mesh between fuel cells could be straight to impart rigidity or, as shown in FIG. 5 of that patent, the mesh between fuel cells was also corrugated, but in all cases, the nickel felt connectors were completely eliminated by direct connection of the crown portion to the nickel coated interconnection, dramatically reducing the number of parts to assemble each bundle. This design while inexpensive requires extremely high quality connector electroplating. And also results in less than desirable physical contact with the nickel plating of the interconnection, so that any given force that is applied to the screen/nickel plated interconnection joint results in very high localized stresses at the points of contact between the mesh and the plating.

In a completely unrelated area, metal foams have been used as a heat exchange media, as taught be D. P. Haack et al. in "Novel Lightweight Metal Foam Heat Exchangers", 2001 ASME Congress Proceedings, New York, November 2001; and as fuel cell components for water management, heat exchange, flow plates and catalyst substrate for reformers as described at www.porvairfuelcells.com, allowing faster transfer of heat energy than in ceramic structures. Metals used include platinum, copper, steel, nickel, silver, cobalt, rhodium and titanium, among others. Ceramic foam filters have also been taught in U.S. Pat. No. 5,456,833 (Butcher et al.)

What is needed is a highly porous nickel based electrical connector/support to conform to and support all contacting fuel cells, as well as to connect all contacting fuel cells electrically, where connector to nickel plated interconnection contact strength is much improved and where electrical conductivity at the same contact point is also much improved. The connector/support must be strong, but it must also be possible to increase even more the desired flexibility by selection of an appropriate combination form or shape, without use of metal felts.

SUMMARY OF THE INVENTION

Therefore, it is a main object of this invention to provide an inexpensive, thin, strong, porous electrical connector/support within tubular solid oxide electrolyte fuel cell bundles in a fuel cell generator.

It is also a main object of this invention to provide an improved method of connecting fuel cell bundles in a fuel cell generator, to positive and negative power leads and bundle row to bundle row connection.

These and other objects of the invention are accomplished by providing a solid oxide fuel cell assembly comprising rows of fuel cells, each having an outer interconnection and an outer electrode, disposed next to each other with corrugated electrically conducting metal mesh between each row of cells, the corrugated mesh having a top crown portion and a bottom shoulder portion, where a flexible open cell nickel foam is disposed between and contacts both the crown portion and the outer interconnections of the fuel cells in a first row, and where the shoulder portion of the mesh directly contacts the outer electrodes of the fuel cells in a second row, said nickel foam and mesh electrically connecting each row of fuel cells, said mesh having a single corrugation with a top portion between fuel cells in a row and where there are no metal felt connections between any fuel cells.

The invention also comprises a plurality of solid oxide fuel cell assemblies comprising a fuel cell bundle, each bundle comprising a first row of spaced apart, axially elongated tubular fuel cells, each containing an outer electrode and an outer interconnection, the second row being spaced apart from the first row, where all the outer interconnections of the first row fuel cells face all the outer electrodes of the second row fuel cells; and an electrically conducting connector support for the fuel cells, extending between and contacting the first row and the second row of fuel cells, where the connector support consists of an expanded mesh more than about 60% porous and having a thickness between 0.012 cm (0.005 inch) and 0.076 cm (0.03 inch), said connector support having a corrugated structure with a series of top crowns connected to bottom shoulder sections, where the shoulder sections conform to the shape of their contacting tubular fuel cells, where each shoulder section is connected to its adjacent shoulder section, where a flexible open cell nickel foam is disposed between and contacts both of the top crowns and the interconnections of the first row fuel cells, and all of the support shoulder sections directly contact the outer electrodes of the second row fuel cells, said mesh having a single corrugation with a top portion between fuel cells in a row and where there are no metal felt connections between any fuel cells. Preferably, the connector support is made of nickel.

The invention also comprises a plurality of fuel cell assemblies where each assembly comprises a fuel cell bundle, as described above, including a bottom and top bundle, where, in the connection between each bundle, each bundle connector support contacts an adjacent bundle connector support, the single corrugation in the adjacent mesh bundle connection as well as the top corrugated portions opposite each other form a void volume which is filled with flexible open cell nickel foam, where the foam in the void volume improves electrical connection from bundle to bundle. In the above invention, bundle to power lead connections are made by attaching the last bundle connection support to a corrugated expanded mesh having flat surfaces attached to the power lead and corrugated surfaces disposed within the power lead, where the top portion of the corrugation in the last bundle connection is opposite the corrugated surface within the power lead and the volume in those corrugations filled with flexible open cell nickel foam.

The invention even further comprises a method of manufacturing, a solid oxide fuel cell assembly, comprising the steps of: (1) providing a first and second row of spaced apart, axially elongated tubular fuel cells, the second row being spaced apart from the first row, each fuel cell containing an outer electrode and an outer interconnection, where all the outer interconnections of the first row fuel cells face all the outer electrodes of the second row fuel cells; (2) providing a flat sheet of expanded nickel mesh having a porosity over about 60% and a thickness between 0.012 cm and 0.076 cm; (3) forming the flat, expanded nickel mesh sheet into a corrugated structure with a series of top crowns connected to the bottom shoulder sections where the mesh between shoulder sections has a single corrugation with a top portion to provide a flexible connector support, and where at least the shoulder sections will conform to the shape of the tubular fuel cells of the first and second rows of fuel cells; (4) adding an organic adhesive mixed with nickel powder to cover the crowns and shoulder portions of the corrugated nickel mesh connector support; (5) disposing a strip of flexible open cell nickel foam on top of the adhesive covering the crown of the connector support; (6) adding an organic adhesive mixed with nickel powder to the flexible open cell nickel foam strip; (7) disposing the corrugated connector support with its top nickel foam with adhesive on both the top of the foam and both the shoulders, between the first and second rows of fuel cells, such that all of the nickel foam strips on the top of the connector support top crowns contact and adhere to the interconnections of the first row fuel cells and al of the connector support shoulder sections contact and adhere to the outer electrodes of the second row fuel cells; (8) drying the adhesive by passing hot air through the porous connector support; and (9) sintering the fuel cell assembly to vaporize the organic portion of the adhesive and provide an integral fuel cell assembly. The sintering can be accomplished during manufacture of a cell bundle or during startup of a fuel cell generator containing the assembly. Epoxy resin has been found to vaporize easily and provides no ill effects on the fuel cell components. Additionally, the sections between crown top and shoulder are corrugated for increased flexibility.

The flexible open cell nickel foam used in the previous embodiments of the invention has a high ratio of surface area to density, tortuous flow channels and intermediate strength properties. It must be strong yet flexible. Density of the foam is preferably in the range of 20 kg/m$^3$ to 40 kg/m$^3$. Specific surface area is in the range of 10000 m$^2$/m$^3$ to 15000 m$^2$/m$^3$. Compressive strength is in the range of 0.15 MPa (22 lb/in$^2$) to 0.25 MPa (36.7 lb/in$^2$) to crush while tensile strength is in the range of 0.5 MPa (73.5 lb/in$^2$) to 1 MPa (147 lb/in2) to completely tear apart. The foam structure consists of ligaments forming a network of interconnected cells which are randomly oriented and mostly homogeneous in size and shape. The useful foam is a fine foam having a reticulated structure and from about 75 pores per linear inch to about 105 pores per linear inch. Pores per linear inch can be counted from an enlarged photograph.

This provides a very porous, thin, extremely tough electrical connector support combination for tubular solid oxide fuel cells, allowing elimination of much hand labor, reducing total parts for a 24-cell bundle from 440 to about 60, cutting production time about 50%, as well as allowing automated assembly. Also this design has improved conductivity provided by the nickel foam, with a higher cell to cell electrical conductivity, increased total flexibility, and less stress to top/bottom fuel cells connections for any given force due to use of the foam. This feature by virtue of greatly enhanced foam to plated interconnection strip connectedness which is facilitated by the great number of points of contact. Localized stresses are also greatly reduced for any given load. In contrast the direct connection of mesh to interconnection has few points of contact which results in lower electrical conductance and lower joint strength.

BRIEF DESCRIPTION OF THE DRAWINGS

In order that the invention can be more clearly understood, convenient embodiments thereof will now be described, by way of example, with reference to the accompanying drawings, in which.

DESCRIPTION OF THE PREFERRED EMBODIMENTS

In the preferred practice of the present invention, natural gas or an incompletely combusted gas is employed as a fuel gas on the plenum side of a solid oxide fuel cell (SOFC) generator. Air is preferably employed as an oxidizing gas flowing within the tubular fuel cells. Also, other fuel gas and oxidizing gases may be employed in place of natural gas and air.

Figure 1:
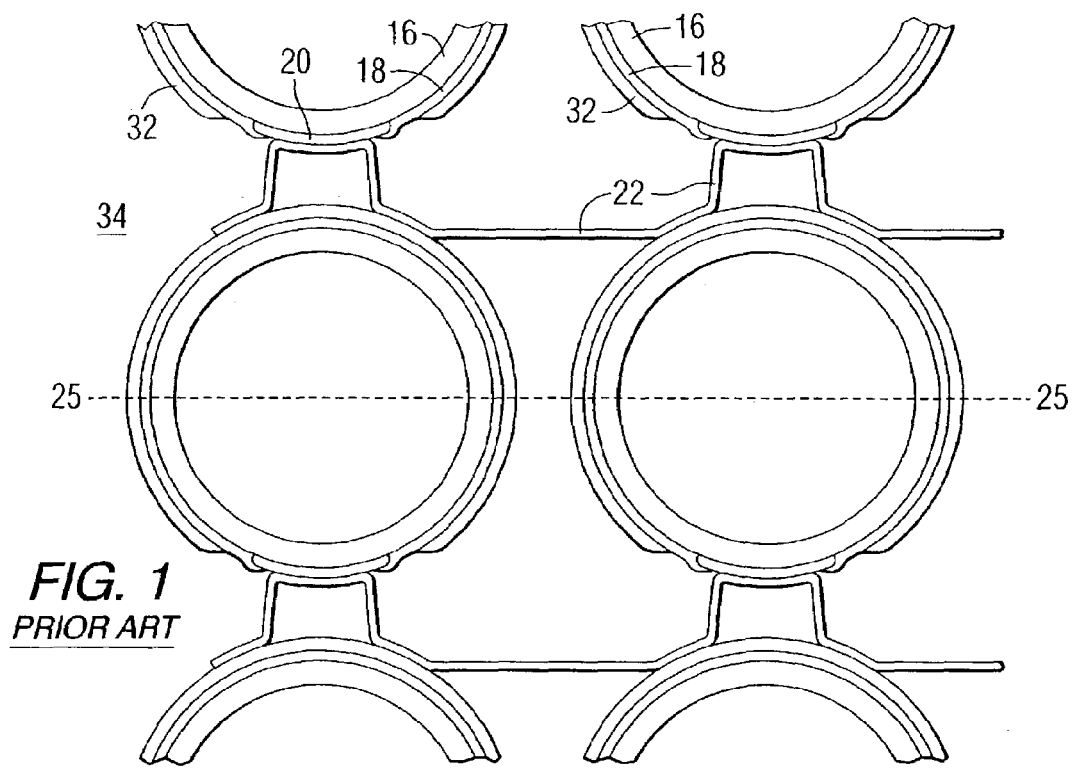
FIG. 1 is a cross-sectional view of one embodiment of a prior art fuel cell assembly.
Figure 2:
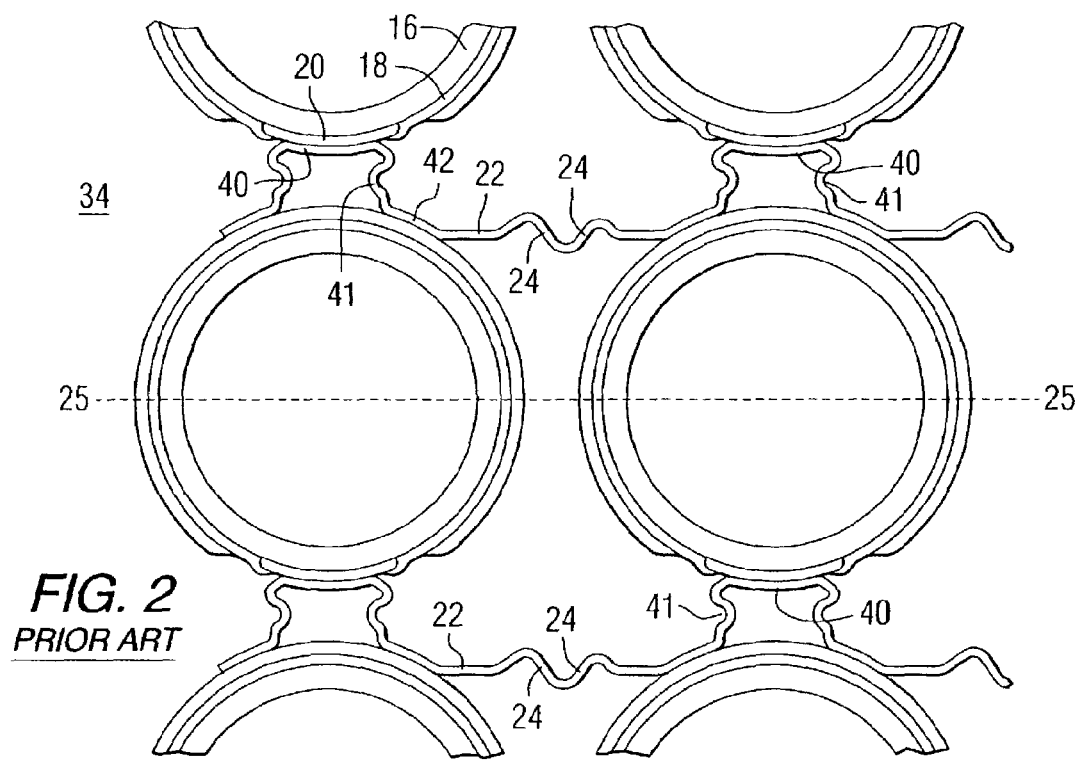
FIG. 2 is a cross-sectional view of another embodiment of a prior art fuel cell assembly.

FIG. 1 shows a prior art design for a group of fuel cells 34 connected with shoulder conducting member 22 without use of nickel fiber strips. Also shown is the self supporting inner air electrode 16 solid oxide electrolyte 18, interconnection 20, usually nickel coated and outer fuel electrode 32. The center of one row is shown as dashed line 25. FIG. 2 shows another prior art design for a group of fuel cells 34 connected with a more corrugated shoulder conducting member 22 where the shoulder connector portion 23 has at least two corrugations 24 as well as a top crown portion 40 with additional crown corrugations 41, all making for a very springy construction.

Figure 3:
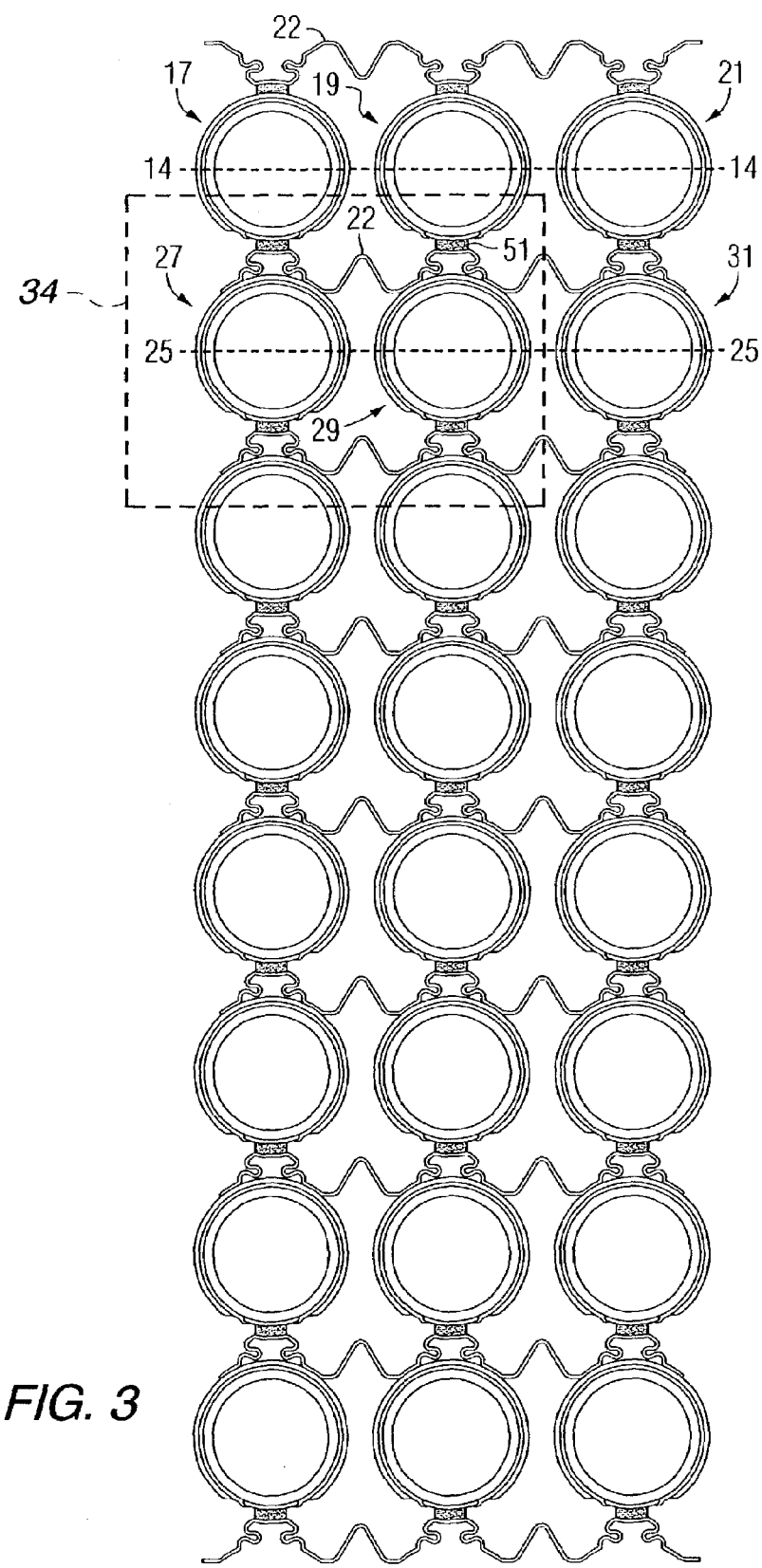
FIG. 3 is a cross-sectional view of a 24 fuel cell bundle in accordance with this invention.

FIG. 3 shows an 8×3 cell bundle array of fuel cells in the plenum of a generator, embodying the present invention. The array comprises rows of fuel cells, such as, for example, a first row 14 including fuel cells 17, 19, and 21, which are electrically connected in parallel by an electrically conducting member extending between cells. Fuel cells 17, 19, and 21 are also electrically connected in series with the fuel cells in the adjacent second row 25, including fuel cells 27, 29, and 31 by the member 22, as well as by strips of open cell nickel foam 51 (shown more clearly in FIGS. 5 and 9).

Figure 4:
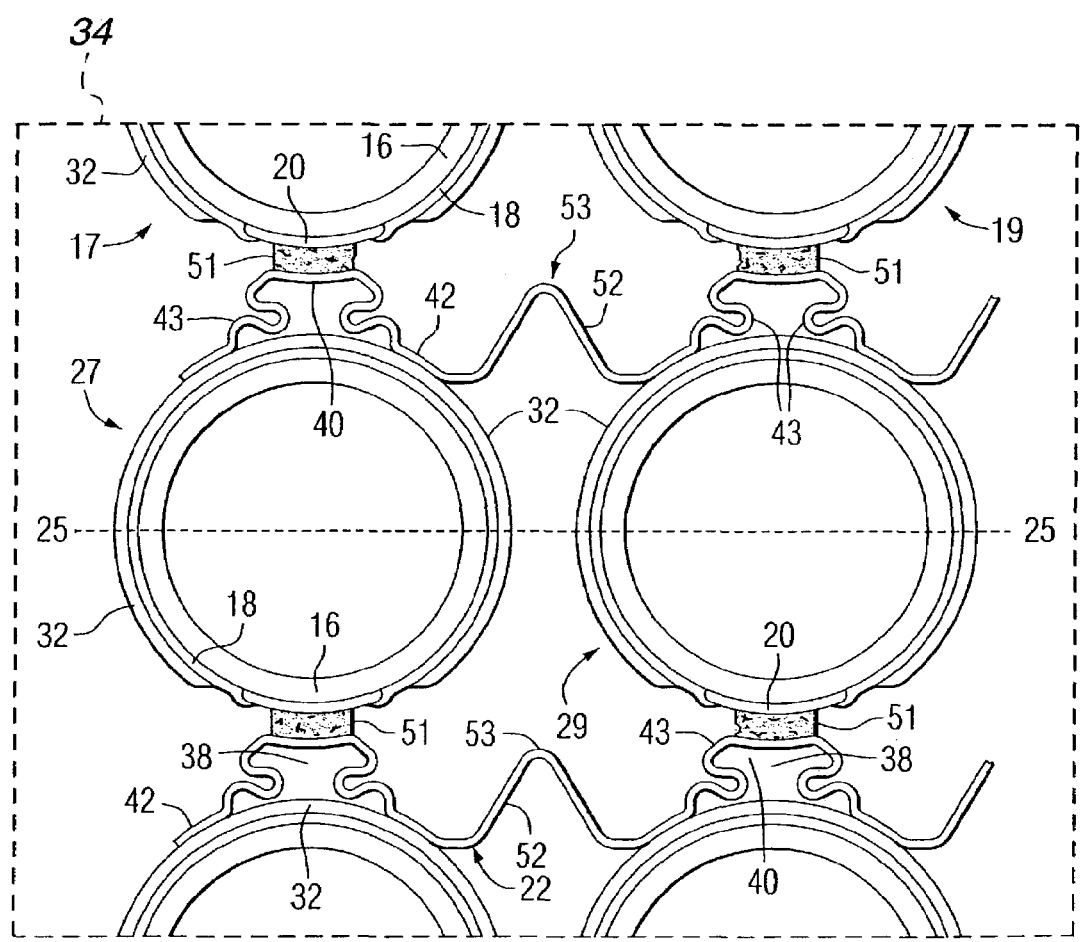
FIG. 4 is a detailed cross-sectional view of a part of the fuel cell bundle of FIG. 3, in accordance with this invention.

FIG. 4 shows in more detail the group of fuel cells 34 using nickel foam strips 51 in accordance with this invention. The conducting member 22 is a thin sheet of porous, nickel such as an expanded or woven nickel mesh or screen which contacts the outer electrodes 32 of the cells 27 and 29 in the fuel cell row 25, and the open cell nickel foam 51 of the cells 17 and 19 in the upper row, with a single corrugation 52 with a top corrugated portion 53 of the conducting member between the fuel cells. Also shown is the hollow unfilled volume 38 between the nickel foam material 51 and the outer electrodes 32 within the crown portion 40 of the conducting member 22, which functions along with open pore, nickel metal foam 51 as a flexible connector support.

The conducting member 22 also has bottom shoulder sections 42 connected to the top crowns 40 by corrugated crown sidewall 43, where the crowns and shoulder sections conform to the shape of their contacting tubular fuel cells, and each shoulder section 42 is connected to its adjacent shoulder section by conducting member 22. The sections connecting the crown and shoulder are not straight, but have a single corrugation 53 giving sufficient rigidity for the handling of the bundle during assembly of the generator while at the same time sufficient flexibility to the structure to accommodate any dimensional changes in the bundle structure which might be caused by differential thermal expansion of the bundle and ceramic structures which connect to the bundle. Also, all of the outer interconnections 20 of the first row 14 of fuel cells, such as 17 and 19, face all of the outer electrodes of the second row 25 of fuel cells, such as 27 and 29. As shown, there are no metal felt connections between any fuel cells, but there is a complete substitution of an open pore nickel foam 51 which provides advantages of substantially lower cost relative to nickel felt and greater structural stability relative to nickel felt.

Figure 5:
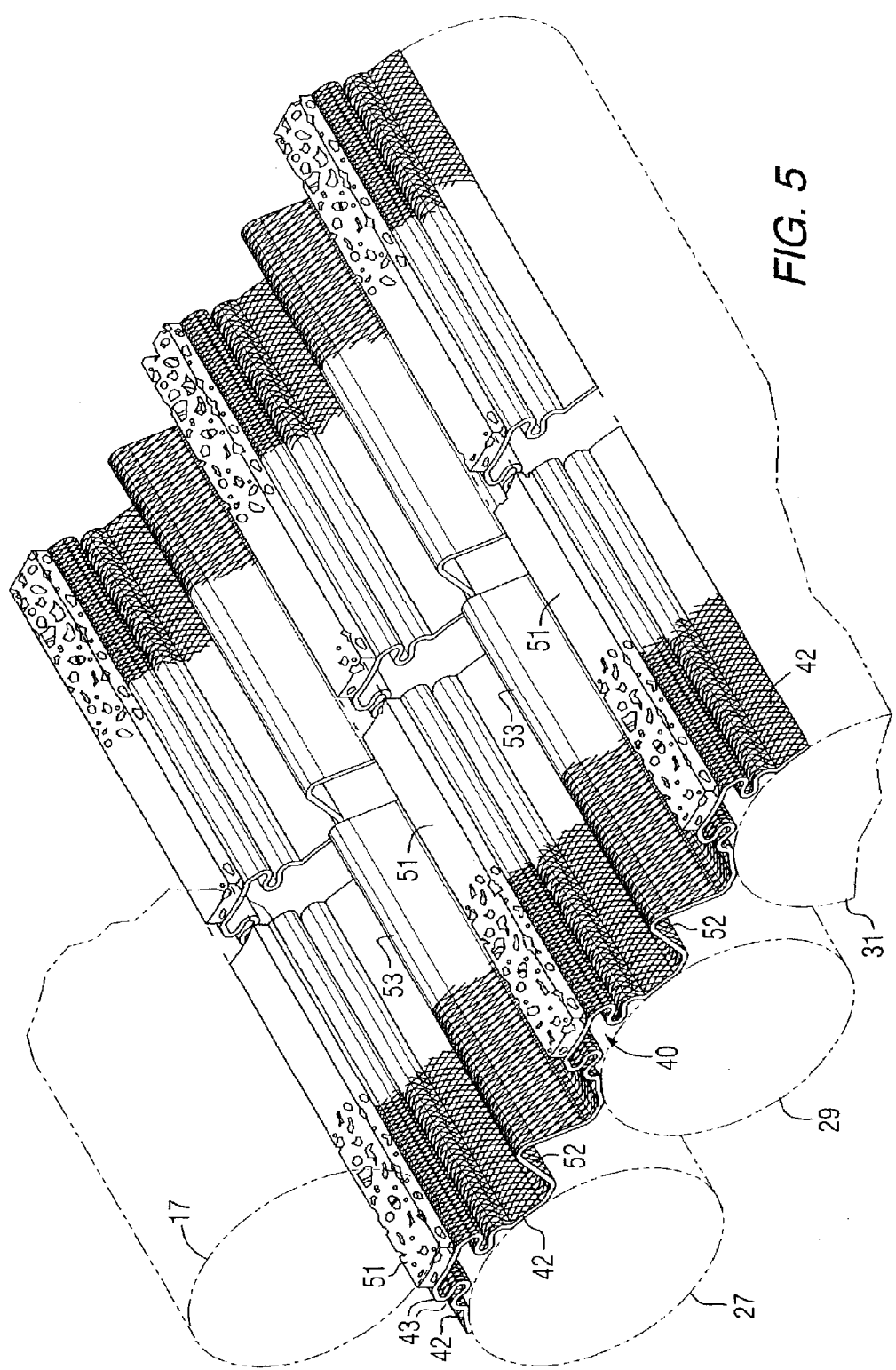
FIG. 5, which best embodies the invention, is a three-dimensional, cross-sectional view of the corrugated structure of this invention, topped with a nickel foam strip, disposed between a first row and a second row of fuel cells.

FIG. 5 more clearly shows the character of the single corrugated 52 connector support of the conducting member, with corrugated sections 43 between crown and shoulder and a top corrugated portion 53. As shown in FIG. 5, fuel cells are part of the rows of spaced apart, axially elongated tubular fuel cells (not shown here in any detail, for the sake of simplicity). All of the fuel cells comprise an inner self-supported air electrode 16, a solid electrolyte 18 (which is oxygen ion conductive at over 650° C.), an outer fuel electrode 32 and an outer interconnection 20 as best shown in FIG. 4.

The conducting member, with single corrugation 52 and top corrugated portion 53 consists of a strong expanded mesh, preferably of nickel, which is over about 60% porous, preferably 65% to 80% porous, having a thickness between 0.025 cm (0.01 inch) and 0.076 cm (0.03 inch), preferably from 0.012 cm (0.005 inch) to 0.076 cm (0.03 inch). Material thickness which is substantially outside of the range of 0.012 cm through 0.076 cm becomes very difficult to corrugate to form crowns 40, crown corrugations 43 and shoulder portions 42. Under 0.012 cm, structural integrity suffers. The mesh is preferably at least 60 vol. % porous, so that fuel can pass easily outside the cells near the fuel electrodes 32, as well as to enable drying of a nickel particle-filled organic-based adhesive, not shown, which is used initially to bond the conducting member 22 to each row of the fuel cell, and the nickel foam 51 to the crown 40. The organic part of the adhesive, preferably an epoxy resin filled with about 40 wt. % to 80 wt. % fine nickel particles, is burned off (or vaporized) during subsequent heating/sintering step at about 1000° C. to 1200° C., prior to or after the fuel cell bundle is placed in the generator, that is, such sintering can occur at generator startup. Epoxy resin volatiles, in particular, have been found to have no adverse effect on fuel cell properties.

The conducting member 22 along with single corrugation 52 has a spring-like effect and provides superior shock absorbing qualities, as compared to metal felts. Additionally, the member 22 is not affected by prolonged operation of twelve months or more at temperatures up to 1200° C. and the metal foam 51 will not shrink or slump (that is, densify and decrease in thickness), as will metal felts. This unique quality of the metal foam is an important feature of the invention, since the prevention of shrinkage of the bundle eliminates the present tendency of the cells to break fragile ceramic upper cell positioning boards.

Thus, this invention is a means of providing the necessary series and parallel electrical connections between tubular solid oxide fuel cells when the cells are assembled in bundles. The means of connection are thin expanded nickel/foam assemblies. Strips of nickel foam are bonded to the crowns. These foam strips substantially improve the post sinter bonding between the connector and the cell interconnections. The entire connector unit is referred to as a "foam-top screen." In this invention both series and parallel electrical connection of tubular solid oxide fuel cells within a bundle is accomplished by the use of the thin expanded nickel foam-top screens. In test assemblies the foam top screens have been 365 mm long. Four foam top screens are used at each junction to cover the length of the bundle. It is possible that a single screen of nominally 145 centimeters length would be used at each junction. Joining of the foam strips to the three crowns of the screen is by means of a nickel filled epoxy. Nickel filled epoxy is also used to join the six shoulders of the screen to the fuel electrodes of three cells, and to join the three foam strips to the nickel plated interconnection strips of three cells. The epoxy gives excellent pre-sintered strength to the bundle. Upon sintering at 1050° C. the binders of the epoxy burn off leaving well-sintered high strength joints. The epoxy is applied as single bead along each of the three foam strips where contact with the interconnection is made. A bead is applied to each shoulder section of the screen. Two shoulders connect to each of the three fuel electrodes. This invention embodies three important improvements relative to prior art. These are: (1) folds in the form of the screen that promotes flexibility in both series (eight cell) direction and parallel (three cell) direction. Flexibility connotes the ability of cells to move relative to other cells within the bundle without the application of substantial force. This attribute facilitates the engagement of ceramic structures that form fuel recirculation and exhaust plena at the open ends of the cells; (2) nickel foam tops which are bonded to the crowns of the screen and which substantially improve post sinter connector/interconnection bond strength and electrical conductivity; this improvement stems from a greatly increased number of points of connection to the interconnection plating that the use of a foam of fine reticulated structure provides; and (3) the inclusion of a ninth connector, which is reversed so that the foam tops connect to the fuel electrodes of an outer parallel connected group of three cells facilitates connections between bundle to adjacent bundle within a row of bundles, bundles to positive and negative power leads, and bundle row to bundle row.

Other benefits of this invention over current practice include: the total number of parts for a 24-cell bundle (including cells) is reduced from 440 to 168; manual assembly of a bundle using mesh takes less than half the time required for that of a bundle using felts; the mesh/metal foam bundle design is much more conducive to automation of the assembly process that is the felt bundle design; when automated, the mesh/metal foam bundle assembly will be accomplished in one-tenth the time presently consumed in assembling a felt bundle; the cost of mesh, including raw materials and formation, is approximately one-tenth that of felts; and cell-to-cell electrical conductivity is higher with mesh than with felts.

Figure 6:
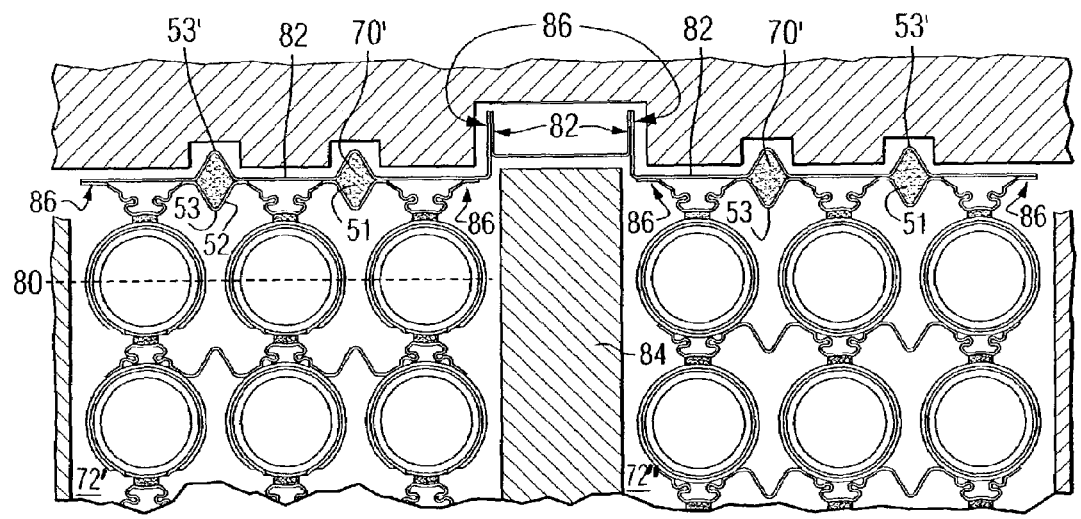
FIG. 6 is a cross-sectional view of the fuel cell bundle to fuel cell bundle connections of this invention.
Figure 7:
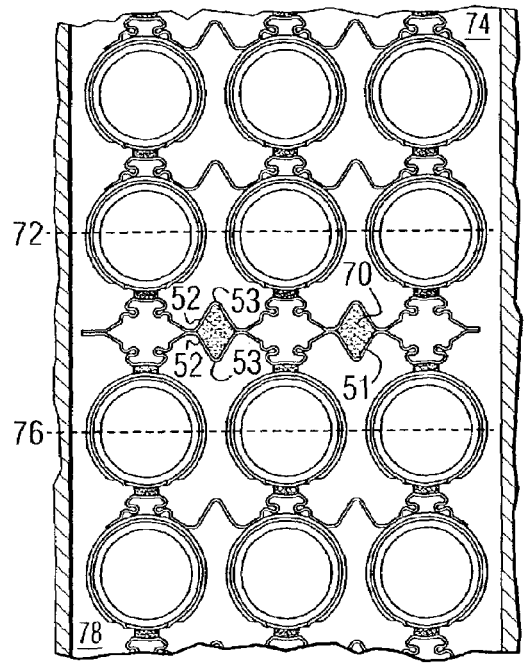
FIG. 7 is a cross-sectional view of the fuel cell bundle row to fuel cell bundle row connections of this invention.

Referring now to FIG. 7, bundle row to bundle row connections are shown where voids 70 between the top corrugated portion 53 of the single corrugation 52 of conducting members of the bottom row 72 of a top bundle 74 and the top row 76 of a bottom bundle 78 are filled with open cell nickel foam 51. FIG. 6 shows bundle to bundle connections where the top corrugated portion 53 of the single corrugation 52 of conducting members of the top row 80 of a top bundle 72' are connected to a top bundle to bundle current collector 82 having a top corrugated portion 53' to provide longitudinal voids 70' which are filled with open cell nickel foam 51. The top bundle to bundle current collector passes from top bundle 72' to an adjacent top bundle 72" over bundle separator insulation board 84. Continuous metal welds are shown at points 86. The top bundle to bundle current collector 82 is an inverted top screen. Thus voids 70 and 70' in FIGS. 6 and 7 between screen conducting members are filled with sandwiched open cell nickel foam 51 which provides improved electrical conductivity. The inclusion of foam strips 51 reduces the voltage drop from bundle to bundle to approximately 25% of the value which pertains if the foam strips are not included.

Figure 8:
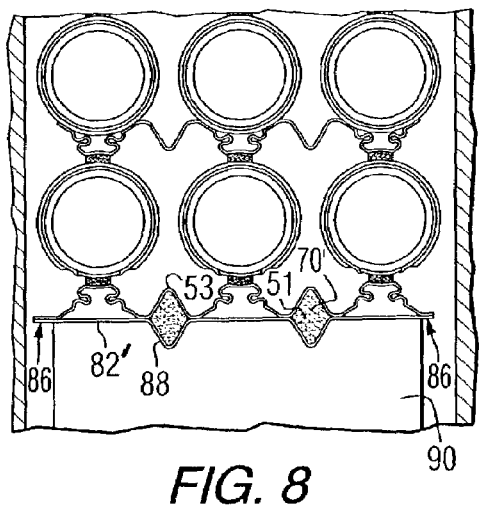
FIG. 8 is a cross-sectional view of the fuel cell bundle to fuel cell power lead connections of this invention.

Similarly, in FIG. 8, bus bar 90 has an attached inverted screen conducting member 82' which as in the other cases shown in FIG. 6, inversely matches the top corrugated portion 53 to provide longitudinal voids 70' filled with open cell nickel foam 51. Thus in all bundle to bundle, bundle row to bundle row and power lead connections open cell nickel foam 51 will fill any longitudinal voids/openings 70, 70' between opposing top corrugated portions 53–53' as shown in FIG. 6, or 53–53' as shown in FIG. 7 or inset portions 88 into the bus bar 90. The inclusion of foam strips 51 reduces the voltage drop from bundle to bundle to approximately 25% of the value which pertains if the foam strips are not included.

Figure 9:
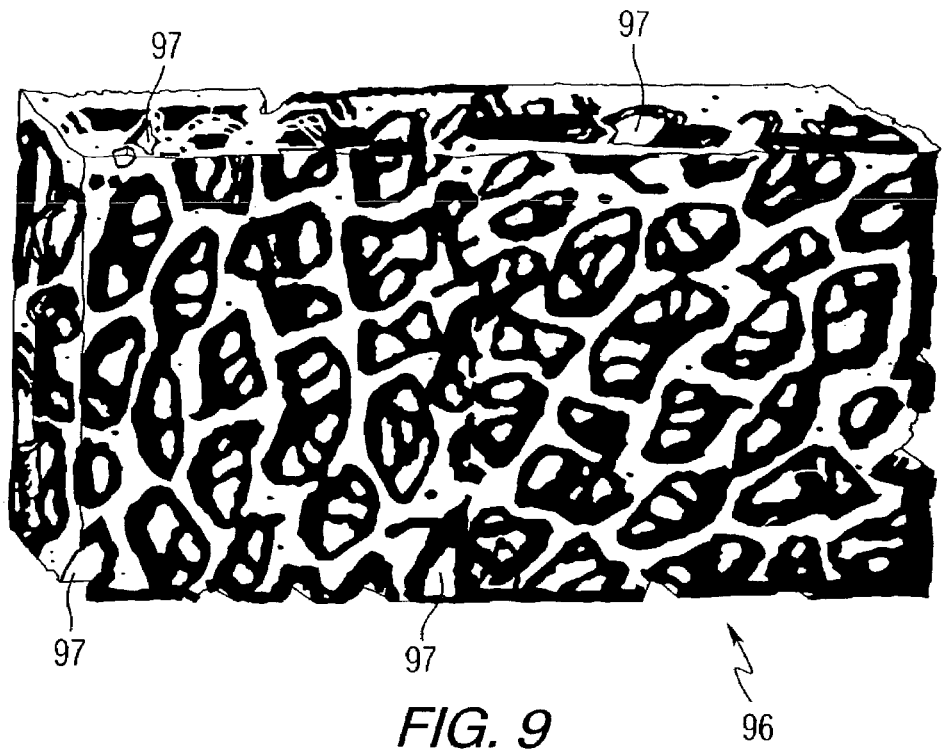
FIG. 9 is a magnified three dimensional view of the nickel foam strip used in this invention.

FIG. 9 shows one type of idealized three dimensional representations of a useful nickel foam. One way to make, a metallic foam is by impregnating an open cell flexible organic foam material, such as polyurethane, with an aqueous metallic slurry—containing fine metallic particles such as nickel particles. The impregnated organic foam is compressed to expel excess slurry. The material is then dried and fired to burn out the organic materials and to sinter the metal/ceramic coating. A rigid foam is thereby formed having a plurality of interconnecting voids having substantially the same structural configurations as the organic foam which was the starting material. The structure is generally seen in FIG. 9 where an idealized cross section of one type of such foam 96 is shown with its interconnecting voids and tortuous pathways 97. It has low density, between 5 vol. % and 20 vol. % of the solid parent metal (that is, it is between 95 vol. % to 80 vol. % porous, and high strength, and has been found to be compliant. The term "compliant" or "compliancy" is here meant as having an effective modulus of elasticity which is low enough to accommodate strain, without transferring substantial forces to the fuel cells which could result in damage to the cells. It has a reticulated, three dimensional, network structure with high surface area to density and a high melting temperature over 1000° C. (in pure form, usually between about 1435° C. to about 1455° C.).

Figure 10:
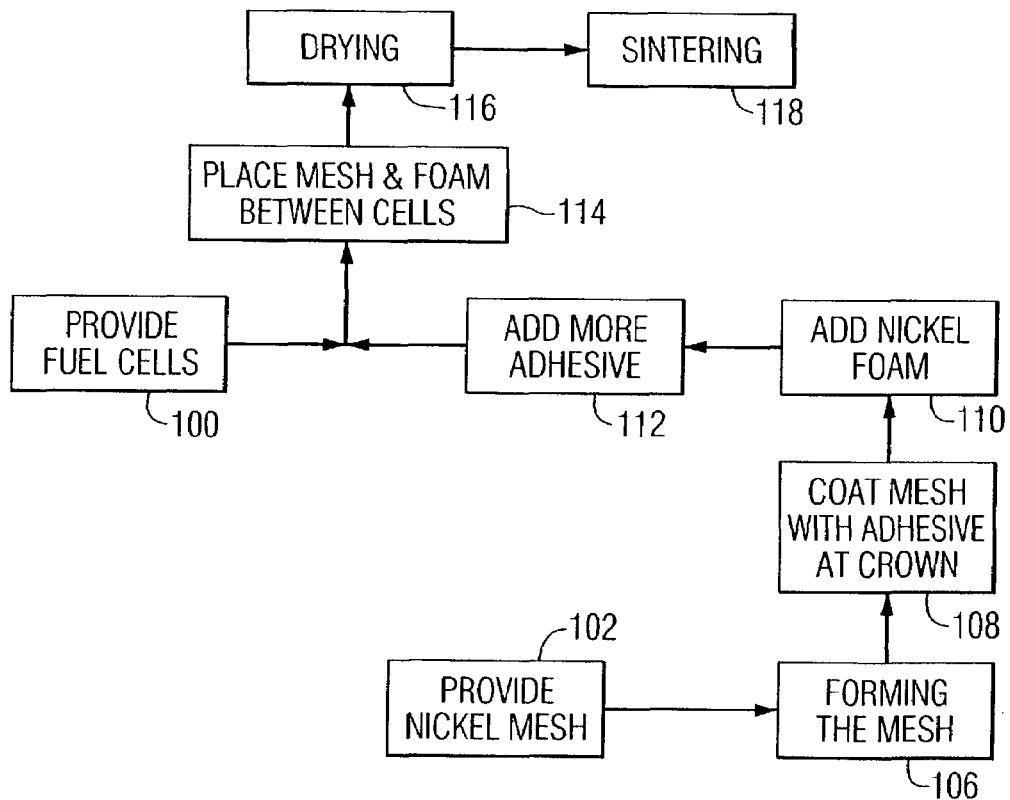
FIG. 10 is a block diagram of one method of this invention.

FIG. 10 generally shows in block form the method of this invention where a first and second row of fuel cells are provided 100, where outer interconnections of the first row face all the outer electrodes of a second row; where a flat sheet of expanded nickel mesh is provided 102, followed by forming 106 the heated mesh into a corrugated structure with a series of top crowns between shoulder sections with a single corrugation between those sections; where an adhesive is coated 108 to cover the crowns and a strip of open cell metal nickel foam is placed 110 on the adhesive covering the crown and then adding 112 more adhesive on top of the foam and upon the shoulders of the mesh and then placing 114 the mesh and foam structure between the fuel cell rows; and drying 116 the adhesive and sintering 118 the fuel cell assembly.

EXAMPLE

Expanded nickel mesh, having diamond-shaped openings, about 65% porous and 0.05 cm (0.02 inch) thick, was placed in a roller die mold which gave the mesh a corrugated structure with a crown contour approximated to fit the contour of tubular solid oxide fuel cells to be made into a bundle similar to that shown in FIGS. 4 and 5. Each corrugated mesh structure was coated at the crown with a bead of epoxy cement admixed with about 70 wt. % small nickel particles. A thin strip of nickel foam (0.6 cm wide× 0.17 cm thick×36 cm long), having a reticulated structure and about 85 pores per lineal inch, sold commercially by Inco under the model designation 200105031011 was placed on the bead of epoxy cement. Then another bead of similar epoxy cement was coated down the top length of he nickel foam strip and upon the shoulder of the mesh. The molded mesh and adhered nickel strips were then layered between rows of three fuel cells, to contact interconnections and fuel electrodes (as shown in FIG. 4), making columns eight fuel cells high. Hot air was blown thought the spaces between the cells and into the spaces within the crowns of the mesh to dry the epoxy. The bundle was then placed in a sintering oven at 1100° C. for two hours to vaporize the epoxy and form a nickel particle-to-mesh/nickel foam bond. Upon cooling, the bundle was tested and found to have excellent structural and electrical properties. Several bundles similar to that shown in FIG. 4, but of 11×2 array, have been fabricated in the manner described by this invention and have demonstrated excellent electrochemical as well as excellent structural properties. The epoxy vaporization did not have any apparent adverse effect on electrical properties. The mesh/nickel foam combinations provided a strong, resilient conducting lamination member connecting and supporting the fuel cells.

What is claimed is:

1. A solid oxide fuel cell assembly comprising rows of fuel cells, each having an outer interconnection and an outer electrode, disposed next to each other with corrugated electrically conducting metal mesh between each row of cells, the corrugated mesh having a top crown portion and a bottom shoulder portion, where a flexible open cell nickel foam is disposed between and contacts both the crown portion and the outer interconnections of the fuel cells in a first row, and where the shoulder portion of the mesh directly contacts the outer electrodes of the fuel cells in a second row, said nickel foam and mesh electrically connecting each row of fuel cells, said mesh having a single corrugation with a top portion between cells in a row and where there are no metal felt connections between any fuel cells.

2. A plurality of solid oxide fuel cell assemblies comprising a fuel cell bundle, each bundle comprising:
   (1) a first row of spaced apart, axially elongated tubular fuel cells, each containing an outer electrode and an outer interconnection;
   (2) a second row of space apart, axially elongated tubular fuel cells, each containing an outer electrode and an outer interconnection, the second row being spaced apart from the first row, where all the outer interconnections of the first row fuel cells face all the outer electrodes of the second row fuel cells; and
   (3) an electrically conducting connector support for the fuel cells, extending between and contacting the first row and the second row of fuel cells, where the connector support consists of an expanded mesh more than about 60% porous and having a thickness between 0.012 cm and 0.076 cm, said connector support having a corrugated structure with a series of top crowns connected to bottom shoulder sections, where the shoulder sections conform to the shape of their contacting tubular fuel cells, where each shoulder section is connected to its adjacent shoulder section, where a flexible open cell nickel foam is disposed between and contacts both of the top crowns and the interconnections of the first row fuel cells, and all of the support shoulder sections directly contact the outer electrodes of the second row fuel cells, said mesh having a single corrugation with a top portion between fuel cells in a row and where there are no metal felt connections between any fuel cells.

3. The solid oxide fuel assemblies of claim 2, wherein the connector support is made of nickel.

4. The solid oxide fuel assemblies of claim 2, wherein the connector support is from 65% to 85% porous.

5. The solid oxide fuel assemblies of claim 2, wherein the connector support is from 0.012 cm to 0.076 cm thick.

6. The solid oxide fuel assemblies of claim 2, wherein the nickel foam has a reticulated structure and from about 75 pores to 105 pores per lineal inch.

7. The solid oxide fuel assemblies of claim 2, wherein the connector support has a spring-like effect providing low force transmission property to the fuel cells.

8. The solid oxide fuel assemblies of claim 2, wherein the connector support and attached nickel foam will not shrink or slump during prolonged operation at temperatures of up to 1200° C.

9. The fuel cell assemblies of claim 2, where each assembly comprises a fuel cell bundle including a bottom and top bundle, where, in the connection between each bundle, each bundle connector support contacts an adjacent bundle connector support, the single corrugation in the adjacent mesh bundle connection as well as the top corrugated portions opposite each other form a void volume which is filled with flexible open cell nickel foam, where the foam in the void volume improves electrical connection from bundle to bundle.

10. The solid oxide fuel assembly of claim 9, wherein the connector support is made of nickel.

11. The solid oxide fuel assembly of claim 9, wherein the connector support is from 65% to 85% porous.

12. The solid oxide fuel assembly of claim 9, wherein the connector support is from 0.012 cm to 0.076 cm thick.

13. The solid oxide fuel assembly of claim 9, wherein the nickel foam has a reticulated structure and from about 75 pores to 105 pores per lineal inch.

14. The solid oxide fuel assembly of claim 9, wherein the connector support has a spring-like effect providing shock resistance to the fuel cells.

15. The solid oxide fuel assembly of claim 9, wherein the connector support and attached nickel foam will not shrink or slump during prolonged operation at temperatures of up to 1200° C.

16. A method of manufacturing a solid oxide fuel cell assembly, comprising the steps of:
   (1) providing a first and second row of spaced apart, axially elongated tubular fuel cells, the second row being spaced apart from the first row, each fuel cell containing an outer electrode and an outer interconnection, where all the outer interconnections of the first row fuel cells face all the outer electrodes of the second row fuel cells;
   (2) providing a flat sheet of expanded nickel mesh having a porosity over about 60% and a thickness between 0.012 cm and 0.076 cm;
   (3) forming the flat, expanded nickel mesh sheet into a corrugated structure with a series of top crowns connected to the bottom shoulder sections where the mesh between shoulder sections has a single corrugation with a top portion to provide a flexible connector support, and where at least the shoulder sections will conform to the shape of the tubular fuel cells of the first and second rows of fuel cells;
   (4) adding an organic adhesive mixed with nickel powder to cover the crowns and shoulder portions of the corrugated nickel mesh connector support;
   (5) disposing a strip of flexible open cell nickel foam on top of the adhesive covering the crown of the connector support;
   (6) adding an organic adhesive mixed with nickel powder to the flexible open cell nickel foam strip;
   (7) disposing the corrugated connector support with its top nickel foam with adhesive on both the top of the foam and both shoulders between the first and second rows of fuel cells, such that all of the nickel foam strips on the top of the connector support top crowns contact and adhere to the interconnections of the first row fuel cells and all of the connector support shoulder sections contact and adhere to the outer electrodes of the second row fuel cells;
   (8) drying the adhesive by passing hot air through the porous connector support; and
   (9) sintering the fuel cell assembly to vaporize the organic portion of the adhesive and provide an integral fuel cell assembly.

17. A plurality of solid oxide fuel cell assemblies comprising a fuel cell bundle, each bundle comprising:
   (1) a first row of spaced apart, axially elongated tubular fuel cells, each containing an outer electrode and an outer interconnection;
   (2) a second row of space apart, axially elongated tubular fuel cells, each containing an outer electrode and an outer interconnection, the second row being spaced apart from the first row, where all the outer interconnections of the first row fuel cells face all the outer electrodes of the second row fuel cells; and
   (3) an electrically conducting connector support for the fuel cells, extending between and contacting the first row and the second row of fuel cells, where the connector support consists of an expanded mesh more than about 60% porous and having a thickness between 0.012 cm and 0.076 cm, said connector support having a corrugated structure with a series of top crowns connected to bottom shoulder sections, where the shoulder sections conform to the shape of their contacting tubular fuel cells, where each shoulder section is connected to its adjacent shoulder section, where a flexible open cell nickel foam is disposed between and contacts both of the top crowns and the interconnections of the first row fuel cells, and all of the support shoulder sections directly contact the outer electrodes of the second row fuel cells, said mesh having a single corrugation with a top portion between fuel cells in a row and where there are no metal felt connections between any fuel cells, where each assembly comprises a fuel cell bundle including a bottom and top bundle, where, in the connection between each bundle, each bundle connector support contacts an adjacent bundle connector support, the single corrugation in the adjacent mesh bundle connection as well as the top corrugated portions opposite each other form a void volume which is filled with flexible open cell nickel foam, where the foam in the void volume improves electrical connection from bundle to bundle.

18. The solid oxide fuel assembly of claim 17, wherein the connector support is made of nickel.

19. The solid oxide fuel assembly of claim 17, wherein the connector support is from 65% to 85% porous.

20. The solid oxide fuel assembly of claim 17, wherein the connector support is from 0.012 cm to 0.076 cm thick.

21. The solid oxide fuel assembly of claim 17, wherein the nickel foam has a reticulated structure and from about 75 pores to 105 pores per lineal inch.

22. The solid oxide fuel assembly of claim 17, wherein the connector support has a spring-like effect providing shock resistance to the fuel cells.

23. The solid oxide fuel assembly of claim 17, wherein the connector support and attached nickel foam will not shrink or slump during prolonged operation at temperatures of up to 1200° C.

* * * * *